United States Patent
Li et al.

(10) Patent No.: US 12,451,542 B2
(45) Date of Patent: Oct. 21, 2025

(54) HEAT EXCHANGER

(71) Applicant: SHAOXING SANHUA AUTOMOTIVE THERMAL MANAGEMENT TECHNOLOGY CO., LTD., Zhejiang (CN)

(72) Inventors: Hua Li, Zhejiang (CN); Fangjian Shan, Zhejiang (CN); Han Shao, Zhejiang (CN); Qinglei Liang, Zhejiang (CN)

(73) Assignee: SHAOXING SANHUA AUTOMOTIVE THERMAL MANAGEMENT TECHNOLOGY CO., LTD., Zhejiang (CN)

( * ) Notice: Subject to any disclaimer, the term of this patent is extended or adjusted under 35 U.S.C. 154(b) by 166 days.

(21) Appl. No.: 18/265,600

(22) PCT Filed: Dec. 8, 2021

(86) PCT No.: PCT/CN2021/136303
§ 371 (c)(1),
(2) Date: Jun. 6, 2023

(87) PCT Pub. No.: WO2022/121919
PCT Pub. Date: Jun. 16, 2022

(65) Prior Publication Data
US 2024/0039079 A1    Feb. 1, 2024

(30) Foreign Application Priority Data
Dec. 8, 2020 (CN) .................. 202011441254.9

(51) Int. Cl.
*H01M 10/6556* (2014.01)
*F28F 3/02* (2006.01)
*F28F 3/04* (2006.01)

(52) U.S. Cl.
CPC ......... *H01M 10/6556* (2015.04); *F28F 3/025* (2013.01); *F28F 3/048* (2013.01)

(58) Field of Classification Search
CPC ...... F28F 3/08; F28F 3/048; F28F 3/10; F28F 3/02; F28F 3/025; H01M 10/6556
(Continued)

(56) References Cited

U.S. PATENT DOCUMENTS 9,631,876 B2 *   4/2017  Zima .................. F28F 3/08
11,024,899 B2 *  6/2021  Park .................. B23K 1/203
(Continued)

FOREIGN PATENT DOCUMENTS

CN    107508010 A   12/2017
CN    109037851 A   12/2018
(Continued)

OTHER PUBLICATIONS

European Search Report issued on Nov. 26, 2024 for the European counterpart application No. 21902624.2.
(Continued)

*Primary Examiner* — Claire E Rojohn, III
(74) *Attorney, Agent, or Firm* — Yue (Robert) Xu; APex Attorneys at Law, LLP

(57) ABSTRACT

A heat exchanger includes a fluid inlet, a fluid outlet, a first plate, and a second plate. A third plate is disposed between the first plate and the second plate; a first fluid channel is formed between the first plate and the third plate, and a second fluid channel is formed between the second plate and the third plate. The heat exchanger has a first end and a second end; the fluid inlet is close to the first end of the heat exchanger and communicated with the first fluid channel; the fluid outlet is close to the first end of the heat exchanger and communicated with the second fluid channel; and the first fluid channel and the second fluid channel are commu-
(Continued)

nicated at the position close to the second end of the heat exchanger.

12 Claims, 9 Drawing Sheets

(58) Field of Classification Search
USPC .......................................................... 165/170
See application file for complete search history.

(56) References Cited

U.S. PATENT DOCUMENTS

| | | | |
|---|---|---|---|
| 11,988,459 B2* | 5/2024 | Pack | F28F 21/081 |
| 2012/0031595 A1* | 2/2012 | Vannman | F28D 9/00 |
| | | | 165/166 |
| 2013/0213623 A1* | 8/2013 | Perocchio | F28F 3/12 |
| | | | 165/170 |
| 2019/0366876 A1* | 12/2019 | Cheadle | F28D 1/035 |
| 2020/0132387 A1* | 4/2020 | Girmscheid | H01M 10/6556 |
| 2020/0166285 A1* | 5/2020 | Andersen | F28F 3/10 |
| 2020/0240721 A1* | 7/2020 | Kenney | F28D 1/035 |
| 2020/0248973 A1* | 8/2020 | Subramanyam | H01M 10/6556 |
| 2020/0271387 A1* | 8/2020 | Eldred | F28F 3/042 |
| 2022/0124943 A1* | 4/2022 | Tominaga | H05K 7/20272 |
| 2022/0187031 A1* | 6/2022 | Zhang | F28F 3/083 |
| 2022/0243999 A1* | 8/2022 | Shaw | F28F 3/10 |
| 2022/0390182 A1* | 12/2022 | Zhang | F28D 9/005 |
| 2023/0349645 A1* | 11/2023 | Zhang | F28F 3/025 |
| 2024/0039079 A1* | 2/2024 | Li | H01M 50/105 |
| 2024/0142179 A1* | 5/2024 | Abe | F28D 15/0233 |
| 2024/0170597 A1* | 5/2024 | Leduc | H10F 77/67 |
| 2024/0175637 A1* | 5/2024 | Li | F28F 3/083 |
| 2024/0219124 A1* | 7/2024 | Nilsson | F28F 3/083 |
| 2024/0302102 A1* | 9/2024 | Li | F28D 9/005 |
| 2025/0035385 A1* | 1/2025 | Matsusaka | F28D 9/0075 |

FOREIGN PATENT DOCUMENTS

| | | |
|---|---|---|
| CN | 109546265 A | 3/2019 |
| CN | 208723046 U | 4/2019 |
| CN | 110718724 A | 1/2020 |

OTHER PUBLICATIONS

International Search Report for PCT/CN2021/136303 mailed Feb. 9, 2022, ISA/CN.

* cited by examiner

HEAT EXCHANGER

This application is a National Phase entry of PCT Application No. PCT/CN2021/136303, filed on Dec. 8, 2021, which claims the priority to Chinese Patent Application No. 202011441254.9, titled "HEAT EXCHANGER", filed with the China National Intellectual Property Administration on Dec. 8, 2020, the entire disclosure of which is incorporated herein by reference.

BACKGROUND

Cooling products related to thermal management, such as cooling plates or cooling tubes used to cool batteries, have high technical requirements for the temperature uniformity of the surface, in contact with batteries, of the heat exchanger, and a temperature difference of 3° C. or even less is specified in the technical requirements. If the surface temperature uniformity of the product cannot meet the requirement, it may affect the safety and product life of devices such as batteries. The heat exchanger in the related art generally has an end plate and a bottom plate, the end plate and the bottom plate are fixed in a sealing way, and a fluid channel for circulating heat exchange fluid is formed between the end plate and the bottom plate. The fluid channel usually adopts an I-shaped loop or a U-shaped loop, the I-shaped loop is to arrange the fluid inlet and the fluid outlet at both ends of the heat exchanger, and the U-shaped loop is to arrange the fluid inlet and the fluid outlet at the same end of the heat exchanger. The fluid channel detours along a width direction of the heat exchanger at the other end of the heat exchanger, and whether the I-shaped loop or U-type loop is adopted, the heat exchange fluid exchanges heat with the parts to be exchanged outside the heat exchanger in the process of flowing from the fluid inlet to the fluid outlet, and the temperature of the fluid gradually increases in the circulation process. Moreover, in order to improve the heat exchange of the heat exchanger, the technology of refrigerant phase change heat exchange is adopted. The corresponding fluid channel is provided with various turbulence structures, the pressure drop of heat exchange fluid flowing through the fluid channel is relatively large, and the corresponding saturation temperature difference is relatively large, which results in a large surface temperature difference of the heat exchanger, and cannot meet the technical requirements of temperature uniformity of the parts to be heat-exchanged.

SUMMARY

The heat exchanger is improved by the application, that is, on the basis of ensuring the heat exchange effect of the heat exchanger, the uniformity of the surface temperature of the heat exchanger is improved.

To achieve the above object, the following technical solutions are provided according to the present application.

A heat exchanger at least includes a fluid inlet, a fluid outlet, and a first plate and a second plate arranged in layers, a third plate is arranged between the first plate and the second plate, a first fluid channel is formed between the first plate and the third plate, a second fluid channel is formed between the second plate and the third plate, the heat exchanger has a first end and a second end, the fluid inlet is close to the first end of the heat exchanger and communicated with the first fluid channel, the fluid outlet is close to the first end of the heat exchanger and communicates with the second fluid channel, the first fluid channel is communicated with the second fluid channel at the second end close to the heat exchanger, at least part of the first fluid channel and at least part of the second fluid channel are arranged adjacent to each other, the third plate includes a spacer, and along a vertical direction of the extension direction of the first fluid channel, a wall forming the first fluid channel and a wall of the second fluid channel, which is adjacent to the first fluid channel, are respectively located on both sides of the spacer.

According to the present application, the fluid channel is divided into a first fluid channel between the third plate and the first plate and a second fluid channel between the third plate and the second plate, that is, the first fluid channel is arranged close to the first plate, and the second fluid channel is arranged close to the second plate. The first fluid channel and the second fluid channel are respectively located at both sides of the third plate, the third plate includes a heat exchange part, the wall forming the first fluid channel and the wall of the adjacent second fluid channel are respectively located at both sides of the heat exchange part, at least part of the heat exchange fluid in the first fluid channel and at least part of the heat exchange fluid in the second fluid channel can exchange heat through the heat exchange part. Taking the evaporator with refrigerant as heat exchange working medium as an example, the gas-liquid two-phase heat exchange fluid flows from the fluid inlet to the first fluid channel near the first end of the heat exchanger, and after passing through the first fluid channel, the heat exchange fluid flows into the second fluid channel from the second end of the first fluid channel close to the heat exchanger, the heat exchange fluid flows through the second fluid channel after heat exchange by the first fluid channel, and then flows to the fluid outlet from the first end of the second fluid channel near the heat exchanger. The temperature of the first end of the first fluid channel is lower than the temperature of the second end of the first fluid channel, the temperature of the first end of the second fluid channel is higher than the temperature of the second end of the second fluid channel, at least part of the heat exchange fluid in the first fluid channel and at least part of the heat exchange fluid in the second fluid channel conduct heat exchange through the heat exchange part, the first plate and the second plate can also conduct heat to achieve the technical effect of reducing the temperature difference of the surface of the first plate and the surface of the second plate, so as to improve the surface temperature uniformity of the first plate and the second plate.

DETAILED DESCRIPTION OF THE EMBODIMENTS

Figure 1:
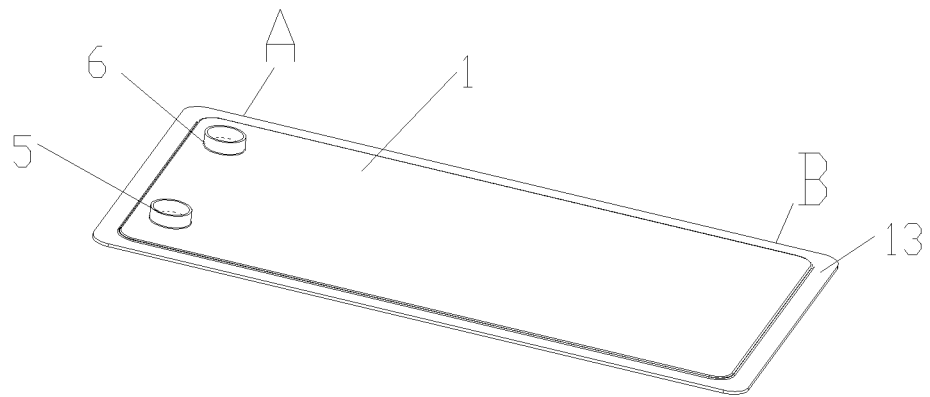
FIG. 1 is a three-dimensional structural diagram of an embodiment of a heat exchanger of the present application.

Referring to FIG. 1 to FIG. 14, a heat exchanger is provided according to the present application, including a first plate 1 and a second plate 2, the first plate 1 and the second plate 2 are fixed in a sealing way, a third plate 3 is arranged between the first plate 1 and the second plate 2, a first fluid channel 8 is formed between the first plate 1 and the third plate 3, a second fluid channel 9 is formed between the second plate 2 and the third plate 3, an outer side surface of the first plate 1 and an outer side surface of the second plate 2 can exchange heat with the parts to be exchanged, for example, with battery assemblies, the heat exchanger has a first end and a second end along a length direction of the heat exchanger, as shown in FIG. 1, an A end is the first end of the heat exchanger, and a B end is the second end of the heat exchanger. The heat exchanger further includes a fluid inlet 5 and a fluid outlet 6, the fluid inlet 5 is close to the first end of the heat exchanger, and is communicated with the first fluid channel 8, the fluid outlet 6 is close to the first end of the heat exchanger, and is communicated with the second fluid channel 9, the first fluid channel 8 is communicated with the second fluid channel 9 at the second end close to the heat exchanger.

According to the present application, the fluid channel is divided into a first fluid channel 8 between the third plate 3 and the first plate 1 and a second fluid channel 9 between the third plate 3 and the second plate 2, that is, the first fluid channel 8 is arranged close to the first plate 1, and the second fluid channel 9 is arranged close to the second plate 2. The first fluid channel 8 and the second fluid channel 9 are respectively located at both sides of the third plate 3, the heat exchange fluids in the first fluid channel 8 and the second fluid channel 9 can exchange heat through the third plate 3, for evaporator with refrigerant as heat exchange working medium, heat exchange fluid in gas-liquid two-phase state flows from fluid inlet 5 to the first end of first fluid channel 8, after passing through the first fluid channel 8, the heat exchange fluid flows from the second end of the first fluid channel 8 to the second end of the second fluid channel 9. The heat exchange fluid flows through the second fluid channel 9 after heat exchange by the first fluid channel 8, and then flows from the first end of the second fluid channel 9 to the fluid outlet 6, the temperature of the first end of the first fluid channel 8 is lower than the temperature of the second end of the first fluid channel, the temperature of the first end of the second fluid channel 9 is higher than the temperature of the second end of the second fluid channel 9. Moreover, at least part of the first fluid channel 8 and at least part of the second fluid channel 9 are arranged adjacent to each other, and the third plate 3 includes a heat exchange part 39. Along a vertical direction of the extension direction of the first fluid channel 8, a wall forming the first fluid channel 8 and a wall of the adjacent second fluid channel 9 are respectively located on both sides of the heat exchange part 39, the heat exchange fluid flowing in the first fluid channel 8 and the heat exchange fluid flowing in the second fluid channel 9 exchange heat through the third plate 3. Of course, in other parts, the heat exchanger also has the part where the first fluid channel and the second fluid channel can exchange heat, which is not described in detail.

Figure 3:
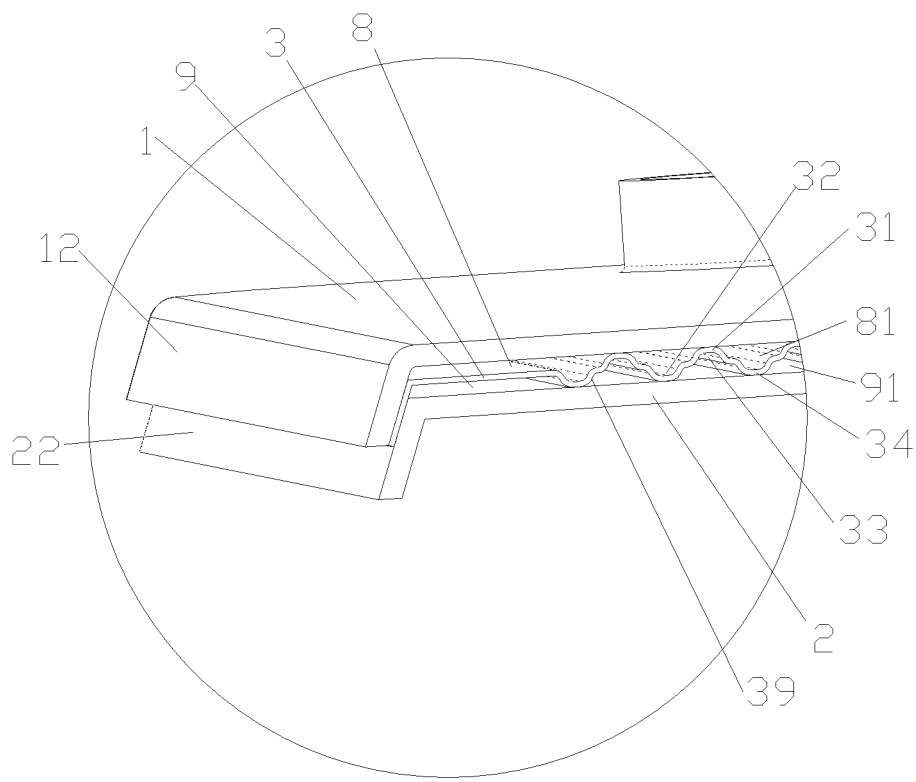
FIG. 3 is a schematic diagram of a partial assembly structure of the heat exchanger of the present application.

In some embodiments, as shown in FIG. 3, the third plate 3 is provided with multiple first convex parts 31 protruding toward the first plate 1 and multiple second convex parts 34 protruding toward the second plate 2. Multiple second concave parts 33 are formed on the side, facing the second plate 2, of the first convex part 31 2, multiple first concave parts 32 are formed on the side, facing the first plate 1, of the second convex part 34, the first fluid channel 8 includes a gap between the first plate 1 and the first concave part 32, the second fluid channel 9 includes a gap between the second plate 2 and the second concave part 33, the heat exchange area of the third plate 3 is increased by arranging multiple convex parts and concave parts on the third plate 3, that is, the heat exchange between the heat exchange fluid in the first fluid channel 8 and the heat exchange fluid in the second fluid channel 9 through the third plate 3 is improved, in this way, the temperature difference between the first fluid channel 8 and the second fluid channel 9 along the length direction of the heat exchanger is decreased, and the temperature uniformity of the surfaces of the first plate 1 and the second plate 2 is improved; moreover, the multiple convex parts and concave parts on the third plate 3 enhance the strength of the heat exchanger.

Figure 4:
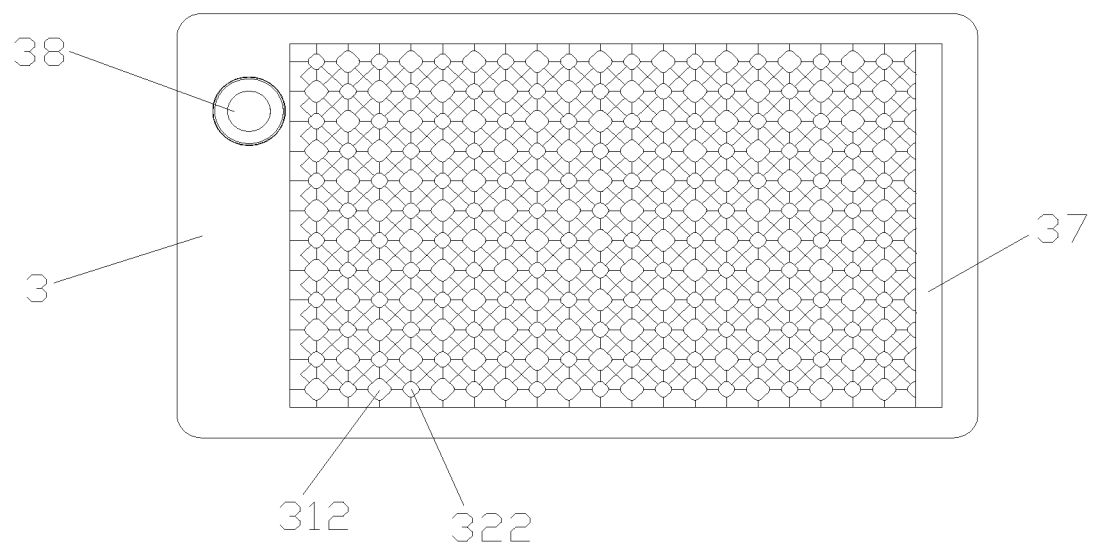
FIG. 4 is a structural diagram of a third plate of the heat exchanger of the present application.
Figure 5:
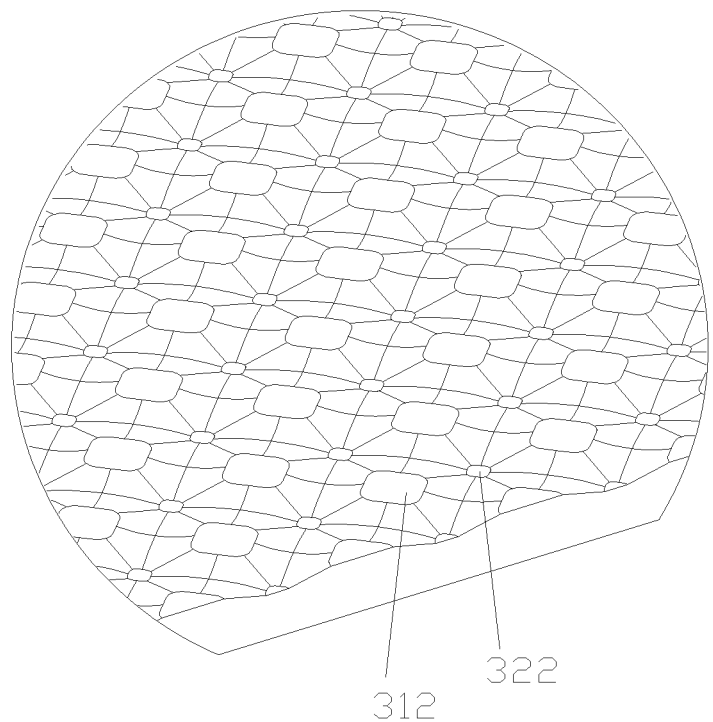
FIG. 5 is an enlarged partial structure of an embodiment of the third plate of the heat exchanger of the present application.

In some specific embodiments, the concave parts and convex parts can be freely adjusted according to the heat exchange requirements to ensure the heat exchange effect of the heat exchanger. For example, each convex part can be a protrusion and each concave part can be a pit, as shown in FIG. 4 and FIG. 5, the third plate 3 is provided with multiple first protrusions 312 protruding toward the first plate 1 and multiple first pits 322 recessed toward the second plate 2, along the length direction and width direction of the heat exchanger, the first protrusions 312 and the first pits 322 are alternately arranged, during assembly, the first protrusions 312 may abut against the first plate 1 to enhance the strength of the heat exchanger, the first protrusions 312 and the first pits 322 are alternately arranged in the first fluid channel 8 to improve the heat exchange effect between the first fluid channel 8 and the second fluid channel 9, thereby improving the temperature uniformity of the surfaces of the first plate 1 and the second plate 2.

Figure 6:
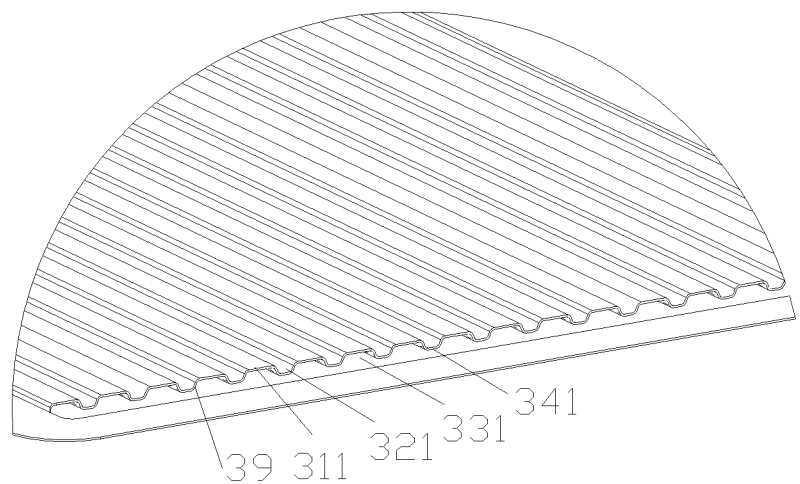
FIG. 6 is an enlarged partial structure of another embodiment of the third plate of the heat exchanger of the present application.

In some specific embodiments, each convex part can be a convex rib and each concave part can be a groove, as shown in FIG. 3 and FIG. 6, the third plate 3 is provided with multiple first ribs 311 protruding toward the first plate 1 and multiple first grooves 321 recessed toward the second plate 2, a second groove 331 is formed on the side of the first rib 311 facing the second plate 2, a second rib 341 is formed on the side, facing the second plate 2, of the first groove 321, the first ribs 311 and the first grooves 321 extend along the length direction of the heat exchanger, and the first ribs 311 and the first grooves 321 are alternately arranged along the width direction of the heat exchanger, during assembly, the first rib 311 may abut against the first plate 1, and the second rib 341 may abut against the second plate 2 to improve the overall strength of the heat exchanger. The first fluid channel 8 is divided into multiple first sub-channels 81 arranged in the width direction of the heat exchanger by the first ribs 311 and the first grooves 321, the second fluid channel 9 is divided into multiple second sub-channels 91 arranged in the width direction of the heat exchanger by the second ribs 341 and the second grooves 331, and the first sub-channel 81 and the second sub-channel 91 are alternately arranged, which improves the heat exchange between the first sub-channel 81 and the second sub-channel 91, and decreases the temperature difference of the heat exchange fluid in the first sub-channel 81 and the second sub-channel 91, thereby improving the temperature uniformity of the surfaces of the first plate 1 and the second plate 2.

In some embodiments, the cross-sectional areas of the first fluid channel 8 and the second fluid channel 9 may be the same or different, in order to improve the heat exchange of the heat exchanger, in some specific embodiments, the cross-sectional areas of the first fluid channel 8 and the second fluid channel 9 are arranged differently, as shown in FIG. 6, the third plate 3 is provided with multiple first ribs 311 protruding toward the first plate 1 and multiple first grooves 321 recessed toward the second plate 2, a second groove 331 is formed on the side, facing the second plate 2, of each first rib 311, a second rib 341 is formed on the side, facing the second plate 2, of the first groove 321, the first ribs 311 and the first grooves 321 extend along the length direction of the heat exchanger, and the first ribs 311 and the first grooves 321 are alternately arranged along the width direction of the heat exchanger, a first fluid channel 8 is formed between the first rib 311 and the first plate 1, a second fluid channel 9 is formed between the second groove 331 and the second plate 2, the maximum width of the first groove 321 is smaller than the maximum width of the second groove 331, that is, the flow area of the first fluid channel 8 is smaller than the flow area of the second fluid channel 9, as the heat exchange fluid has different dryness in the evaporation process, different flow pressure drops are generated, the heat exchange fluid in the first fluid channel 8 is the heat exchange fluid with a relatively low dryness, and the heat exchange fluid in the second fluid channel 9 after heat exchange is the heat exchange fluid with a relatively high dryness. A pressure drop in the first fluid channel 8 is relatively small, and a pressure drop in the second fluid channel 9 is relatively large, therefore, the flow area of the second fluid channel 9 is increased to reduce the pressure drop in the second fluid channel 9, thereby reducing the temperature difference caused by the pressure drop along the way and improving the heat exchange effect of the heat exchanger.

Figure 7:
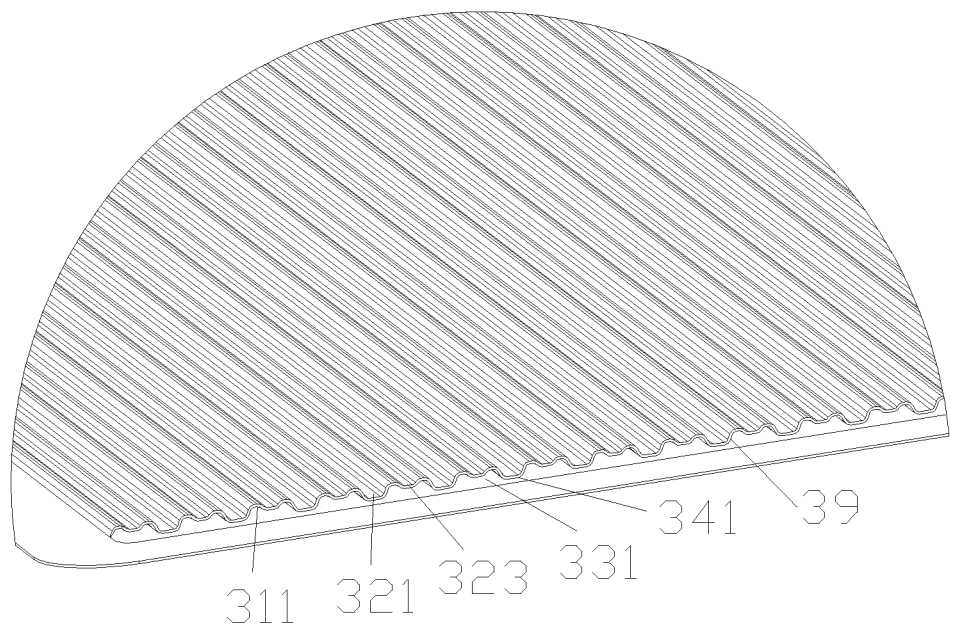
FIG. 7 is an enlarged partial structure of still another embodiment of the third plate of the heat exchanger of the present application.

The difference in cross-sectional areas of the first fluid channel 8 and the second fluid channel 9 may also be realized by using a third plate having other structures, as shown in FIG. 7, the third plate 3 is provided with multiple first ribs 311 protruding toward the first plate 1 and multiple first grooves 321 recessed toward the second plate 2, a second groove 331 is formed on the side, facing the second plate 2, of each first rib 311, a second rib 341 is formed on the side, facing the second plate 2, of the first groove 321, the first ribs 311 and the first grooves 321 extend along the length direction of the heat exchanger, and the first ribs 311 and the first grooves 321 are alternately arranged along the width direction of the heat exchanger, the top of the first rib 311 is provided with a first sub-concave part 323 which is concave toward the second plate 2, along the thickness direction of the heat exchanger, the maximum height of the first sub-concave part 323 is smaller than the maximum height of the second groove 331, a first fluid channel 8 is formed between the first groove 321 and the first sub-concave part 323 and the first plate 1, a second fluid channel 9 is formed between the second groove 331 and the second plate 2, the flow area of the first fluid channel 8 is smaller than the flow area of the second fluid channel 9 by arranging multiple concave parts with different heights, which helps to reduce the pressure drop of the second fluid channel and improve the heat exchange effect of the heat exchanger.

Except that the convex part can be a rib and the concave part can be a groove, other structures can be adopted, for example, the third plate 3 may be provided with asymmetric points to realize that the flow area of the first fluid channel 8 is smaller than the flow area of the second fluid channel 9, as shown in FIG. 5, the third plate 3 is provided with multiple first protrusions 312 protruding toward the first plate 1 and multiple first pits 322 recessed toward the second plate 2, a second pit is formed on a side, facing the second plate 2, of each first protrusion 312, a second protrusion is formed on a side, facing the second plate 2, of the first pit, the maximum diameter of at least some of the first pits 322 is smaller than the maximum diameter of the second pits, so that the flow area of the first fluid channel 8 is smaller than the flow area of the second fluid channel 9, and the arrangement of the protrusions and pits improves the heat exchange efficiency of the heat exchange fluid in the first fluid channel 8 and the second fluid channel 9.

It can be understood that in addition to the above solution, the first fluid channel 8 and the second fluid channel 9 can also adopt the third plate 3 of other structures or arrange the spoiler of different structures on the first plate 1 and the second plate 2 to form the asymmetric structure, so as to reduce the overall pressure drop of the heat exchanger and improve the heat exchange effect of the heat exchanger.

Figure 8:
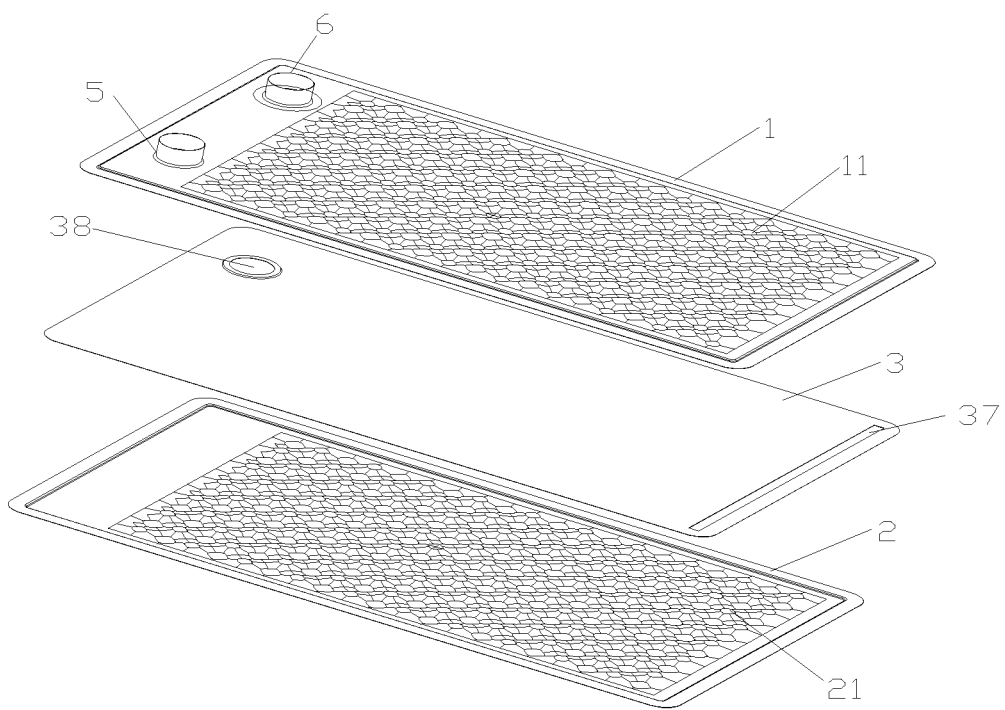
FIG. 8 is a schematic diagram of an explosion structure of another embodiment of the heat exchanger of the present application.

As shown in FIG. 8, the first plate 1, the third plate 3 and the second plate 2 are laminated, the first plate 1 is provided with a third convex part 11 protruding toward the third plate 3, the second plate 2 is provided with a fourth convex part 21 protruding toward the third plate 3, a first fluid channel 8 is formed between the first plate 1 and the third plate 3, a second fluid channel 9 is formed between the second plate 2 and the third plate 3, the third plate 3 can be a flat plate structure as shown in FIG. 7, or it can be a third plate 3 having other structures. For example, the third plate 3 is provided with multiple protrusions protruding toward the first plate 1 and the second plate 2 to improve the heat exchange of the heat exchange fluid in the first fluid channel 8 and the second fluid channel 9.

It can be understood that besides multiple protrusions, the first plate 1 and the second plate 2 can also be provided with convex parts of other structures, such as elongated ribs.

Figure 9:
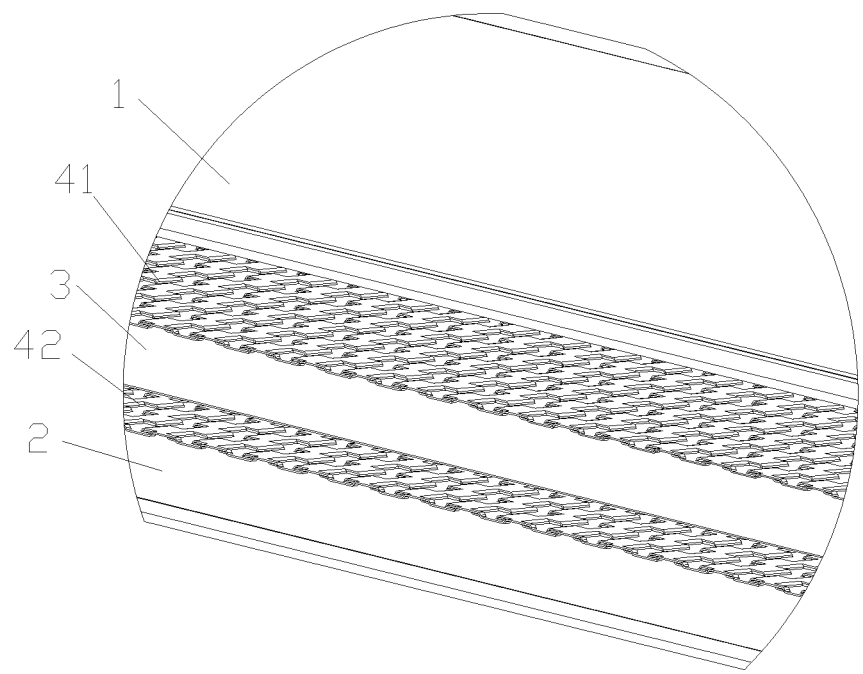
FIG. 9 is a partial schematic diagram of the explosive structure of another embodiment of the heat exchanger of the present application.

As shown in FIG. 9, the heat exchanger includes a first plate 1, a third plate 3, a second plate 2, a first fluid channel 8 is formed between the first plate 1 and the third plate 3, a second fluid channel 9 is formed between the second plate 2 and the third plate 3, a first fin 41 is arranged in the first fluid channel 8 to divide the first fluid channel 8 into multiple first sub-channels, a second fin 42 is arranged in the second fluid channel 9 to divide the second fluid channel 9 into multiple second sub-channels, as shown in FIG. 9, the first plate 1, the third plate 3 and the second plate 2 are flat plates, and the heat exchange of the heat exchanger is improved by the turbulence of the first fin 41 and the second fin 42; of course, the first plate 1, the third plate 3, and the second plate 2 may also have other structures, such as protrusions or grooves are provided to further enhance the disturbance of heat exchange fluid.

Figure 10:
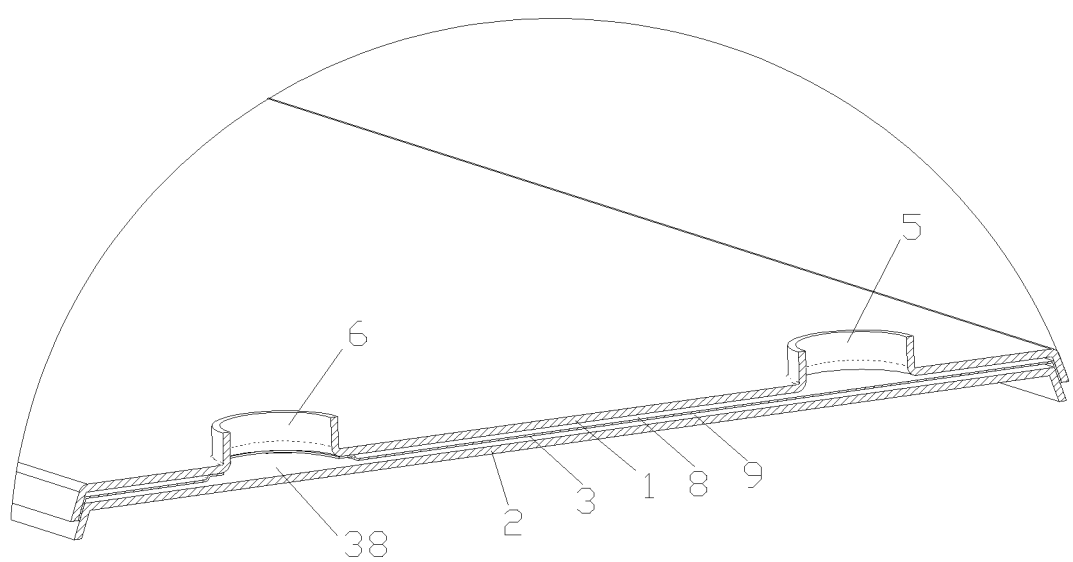
FIG. 10 is a partial structural diagram of a first end of the heat exchanger according to an embodiment of the present application.
Figure 11:
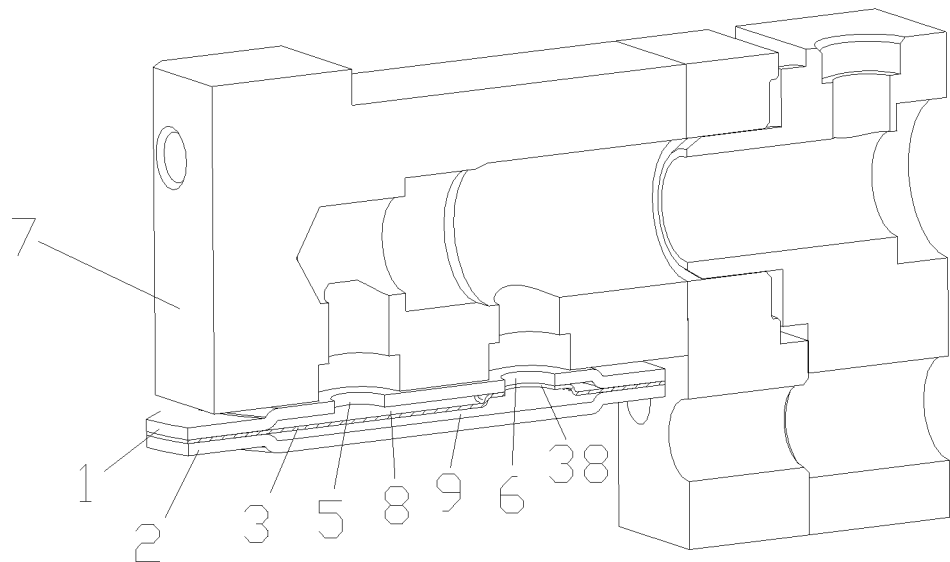
FIG. 11 is a partial structural diagram of the combination of the fluid inlet, the fluid outlet and the valve seat of the heat exchanger of the present application.

As shown in FIG. 10 and FIG. 11, the fluid inlet 5 and the fluid outlet 6 are close to the first end of the first plate 1, and the valve seat 7 is integrated with the heat exchanger, the valve seat 7 includes a valve core and multiple interfaces, one interface of the valve seat 7 is communicated with the fluid inlet 5, and the other interface of the valve seat 7 is communicated with the fluid outlet 6. The valve seat 7 can be an expansion valve, which is internally provided with a throttling device, the first end of the third plate 3 is provided with a communication hole 38 communicating with the fluid outlet 6, the periphery of the communication hole 38 is provided with a boss protruding toward the first plate 1, the boss is fixed with the first plate 1 by welding, the fluid inlet 5 is communicated with the first fluid channel 8 between the first plate 1 and the third plate 3, the fluid outlet 6 is communicated with the second fluid channel 9 between the second plate 2 and the third plate 3 through the communication hole 38; of course, there may be no boss around the communication hole 38, the heat exchanger may be provided with a connecting pipe penetrating the fluid outlet 6 and the communication hole 38, and the outer wall of the connecting pipe is fixed with the first plate 1 and the third plate 3 by welding, thereby communicating the fluid outlet 6 with the second fluid channel 9 between the second plate 2 and the third plate 3, the boss around the third plate 3 is fixed to the first plate 1 by welding, so that the fluid outlet 6 is not communicated with the first fluid channel 8, the fluid outlet 6 is communicated with the second fluid channel 9, which not only makes the heat exchanger simple in structure, but also avoids leakage. As the first fluid channel 8 and the second fluid channel 9 are located on the upper and lower sides of the third plate, the arrangement positions of the fluid inlet 5 and the fluid outlet 6 need not be determined according to the positions of the first fluid channel 8 and the second fluid channel 9, for example, in a commonly used U-shaped loop arranged in the width direction of the heat exchanger, the fluid inlet 5 and the fluid outlet 6 must correspond to the first loop and the second loop of the U-shaped loop, since the first loop and the second loop have a certain width, if the fluid inlet and the fluid outlet are too close, the uniform distribution of heat exchange fluid flowing from the fluid inlet into the first loop may be affected, therefore, the fluid inlet and the fluid outlet must be separated by a predetermined distance, if I shaped-loop is adopted, the fluid inlet and the fluid outlet are located at both ends of the heat exchanger, which is more inconvenient to assemble. The first fluid channel 8 and the second fluid channel 9 are arranged along the thickness direction of the heat exchanger, the fluid inlet 5 is communicated with the first fluid channel 8, the fluid outlet 6 is communicated with the second fluid channel 9 below the third plate 3, and the fluid inlet 5 and fluid outlet 6 can be arranged close to each other to facilitate the pipeline connection of the heat exchanger and the integration of multiple components. Of course, the fluid inlet 5 and fluid outlet 6 may both be located on the second plate 2, so that the fluid outlet 6 is communicated with the second fluid channel 9 between the second plate 2 and the third plate 3, the third plate 3 is provided with a communication hole 38 to communicate with the fluid inlet 5, so that the fluid outlet 6 is communicated with the first fluid channel 8 between the first plate 1 and the third plate 3.

In some embodiments, the fluid inlet 5 and the fluid outlet 6 may be located in the first plate 1 and the second plate 2, respectively, for example, the fluid inlet 5 is located in the first plate 1, the fluid outlet 6 is located in the second plate 2, the fluid inlet 5 can be communicated with the first fluid channel 8 between the first plate 1 and the third plate 3 without providing the communication hole 38 in the third plate 3, the fluid outlet 6 is communicated with the second fluid channel 9 between the second plate 2 and the third plate 3 through the communication hole 38; of course, the fluid inlet 5 may also be provided between the first plate 1 and the third plate 3, the fluid outlet 6 may also be provided between the second plate 2 and the third plate 3, for example, the first end of the first plate 1 is provided with a protrusion protruding away from the third plate 3, so that a fluid inlet 5 is formed between the protrusion and the third plate 3, the first end of the second plate 2 is provided with a protrusion protruding away from the third plate 3, so that a fluid outlet 6 is formed between the protrusion and the third plate 3.

Figure 12:
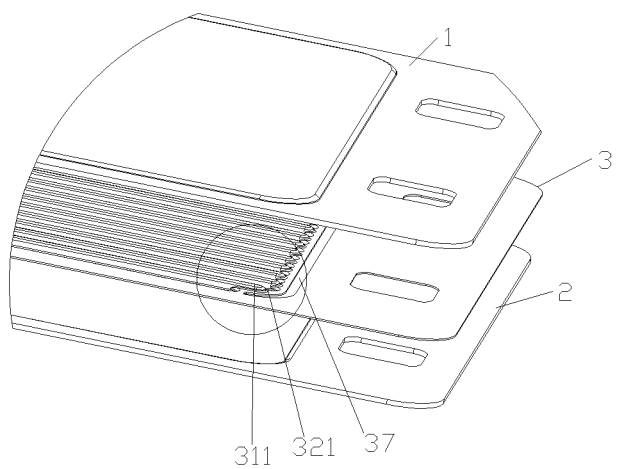
FIG. 12 is a partial structural diagram of a second end of the heat exchanger according to an embodiment of the present application.
Figure 16:
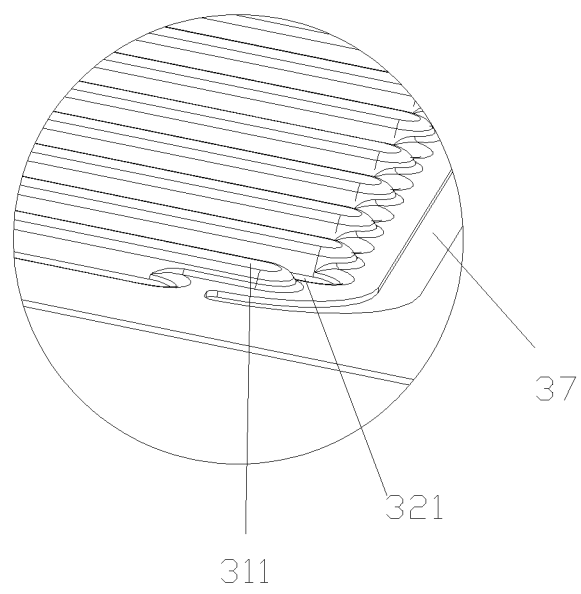
FIG. 16 is an enlarged diagram of the circle in FIG. 12.

The second end of the third plate 3 is provided with a communication part penetrating through the third plate 3, so as to communicate the second end of the first fluid channel 8 with the second end of the second fluid channel 9, as shown in FIG. 12 and FIG. 16, the third plate is provided with multiple elongated convex parts 311 and elongated concave parts 321 extending along the length direction of the heat exchanger, the elongated convex parts 311 and the elongated concave parts 321 are alternately arranged along the width direction of the heat exchanger, the communication part is a communication groove 37 extending along the width direction of the heat exchanger, the heat exchange fluid flows from the fluid inlet 5 into the first fluid channel 8 between the third plate 3 and the first plate 1, after the heat exchange fluid flows to the second end of the first fluid channel 8, it flows to the second end of the second fluid channel 9 through the communication groove 37, and then flows through the second fluid channel 9 and flows out from the fluid outlet 6. The elongated communication groove 37 reduces the flow resistance, reduces the pressure drop lost when the heat exchange fluid flows from the first fluid channel 8 into the second fluid channel 9, and improves the heat exchange of the heat exchanger. Of course, in addition to the elongated communication groove 37 shown in FIG. 12, the communication part may also adopt multiple through holes to improve the distribution uniformity of the gas-liquid two-phase heat exchange fluid. In addition, the first fluid channel 8 and the second fluid channel 9 may not communicate with each other through the communication part of the third plate 3, the first fluid channel 8 and the second fluid channel 9 can be communicated by providing connecting pipes between the first plate 1 and the third plate 3 and between the second plate 2 and the third plate 3, as long as the first fluid channel 8 and the second fluid channel 9 are communicated at the second end of the heat exchanger, the first fluid channel 8 and the second fluid channel 9 are communicated by the communication part of the third plate 3, so that the structure of the heat exchanger is simple and compact.

Figure 13:
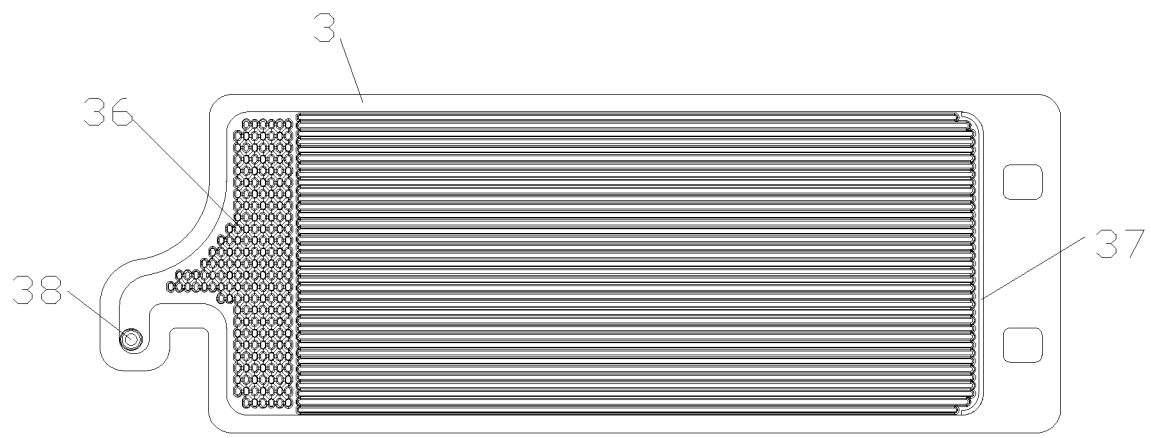
FIG. 13 is another structural diagram of the third plate of the heat exchanger of the present application.
Figure 14:
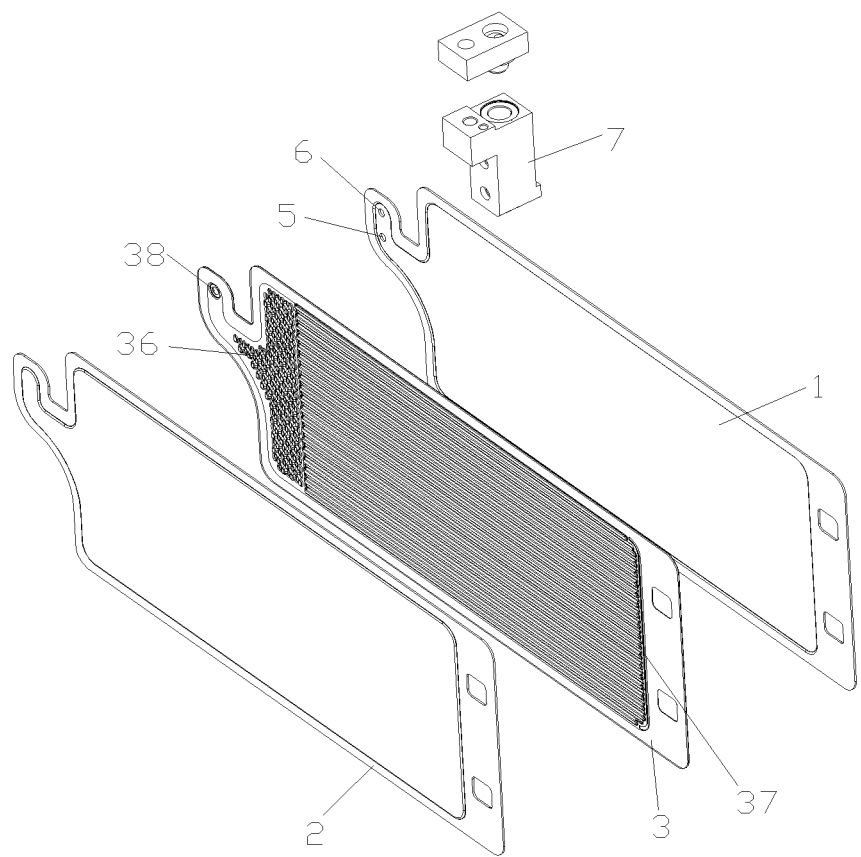
FIG. 14 is a schematic diagram of another explosion structure of the heat exchanger of the present application.

As shown in FIG. 13 and FIG. 14, the first plate 1, the third plate 3 and the second plate 2 are laminated, the third plate 3 has a first end and a second end along the length direction of the heat exchanger, the first end of the third plate 3 is provided with a flow guiding part 36, and one side of the flow guiding part 36 is provided with a communication hole 38, the other side of the flow guiding part 36 is provided with multiple ribs and grooves extending along the length direction of the heat exchanger, the ribs and grooves are alternately arranged along the width direction of the heat exchanger, the flow guiding part 36 is provided with multiple first protrusions protruding toward the first plate 1 and multiple second protrusions protruding toward the second plate 2, a second pit is formed on the side of the first protrusion facing the second plate 2, a first pit is formed on the side, facing the first plate 1, of the second protrusion, the heat exchange fluid flows into the space between the first plate 1 and the third plate 3 from the fluid inlet 5, and the heat exchange fluid is dispersed into multiple grooves between the first plate 1 and the third plate 3 by the flow guiding of the flow guiding part 36, a communication groove 37 is formed at the second end of the third plate 3, the heat exchange fluid flows into the second flow channel between the second plate 2 and the third plate 3 through the communication groove 37, then flows along the groove between the second plate 2 and the third plate 3 to the flow guiding part 36, and converges to the communication hole 38 through the flow guiding part 36, then flows out from the fluid outlet 6. The arrangement of the flow guiding part 36 ensures that the heat exchange fluid can be evenly distributed from the fluid inlet 5 to the first fluid channel 8, and ensures that the heat exchange fluid flowing out of the second fluid channel 9 can flow out of the communication hole 38 smoothly, reduces the pressure drop of heat exchange fluid, which not only makes the heat exchange fluid distribute evenly, but also improves the heat exchange.

Figure 15:
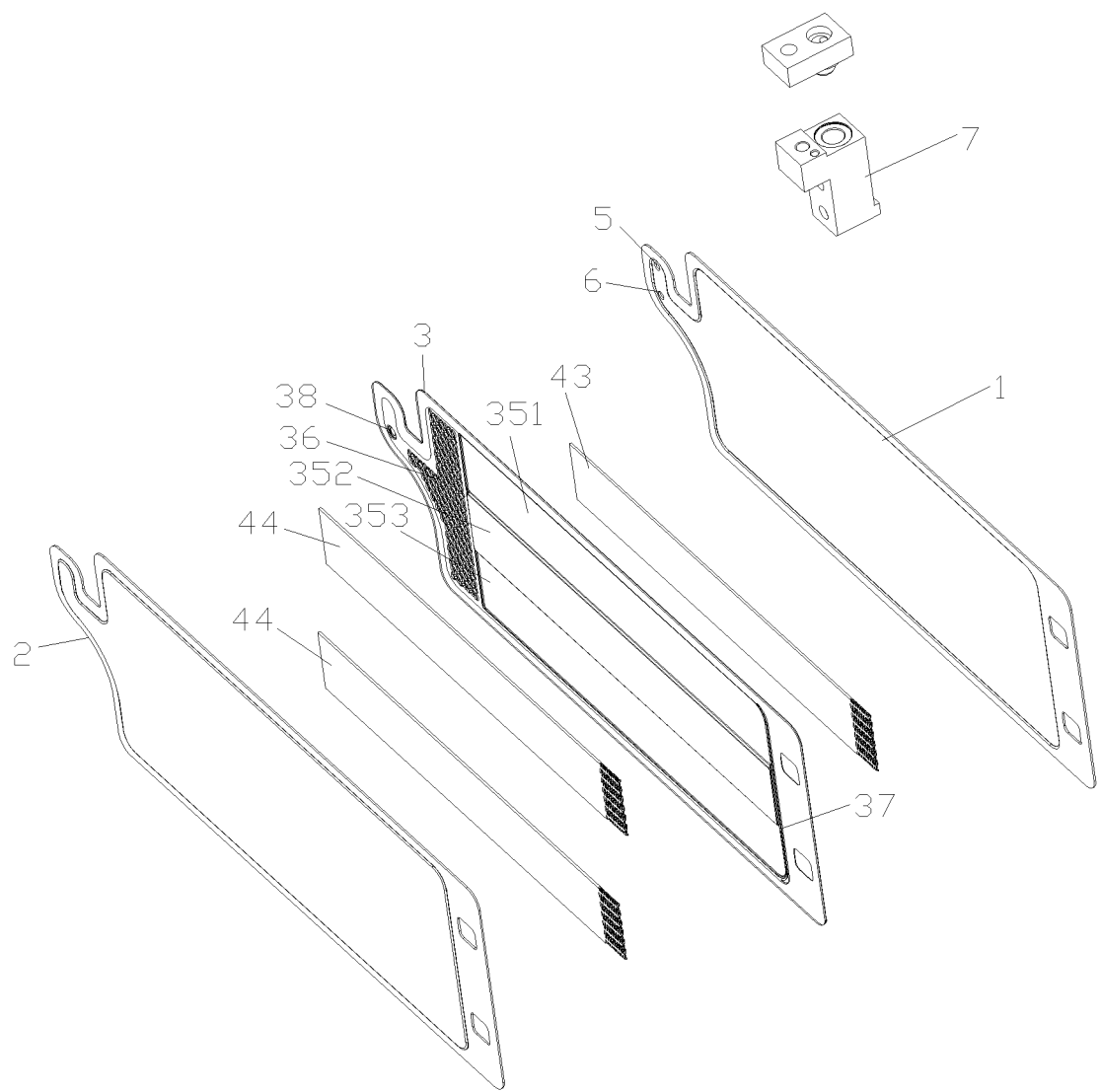
FIG. 15 is a schematic diagram of still another explosion structure of the heat exchanger of the present application.

As shown in FIG. 15, the heat exchanger includes a first plate 1, a third plate 3, a second plate 2, the third plate 3 is provided with a first flat part 351, a second flat part 352 and a third flat part 353 extending along the length direction of the heat exchanger, and the first flat part 351, the second flat part 352 and the third flat part 353 are arranged along the width direction of the heat exchanger, the first flat part 351 and the third flat part 353 abut against the first plate 1, the second flat part 352 abuts against the second plate 2, the first fluid channel 8 includes a gap between the second flat part 352 and the first plate 1, the second fluid channel 9 includes a gap between the first flat part 351, the third flat part 353 and the second plate 2, a third fin 43 is arranged between the second flat part 352 and the first plate 1, a fourth fin 44 is arranged between the first flat part 351 and the second plate 2 and between the third flat part 353 and the second plate 2. The heat exchange fluid flows from the fluid inlet 5 into the first fluid channel 8 between the second flat part 352 and the first plate 1, and is divided into two paths through the communication groove 37 at the second end of the third plate 3, one path flows into the second fluid channel 9 between the first flat part 351 and the second plate 2, the other path flows into the second fluid channel 9 between the third flat part 353 and the second plate 2, then the heat exchange fluid flows from the communication hole 38 at the first end of the third plate 3 to the fluid outlet 6; in this embodiment, the first fluid channel 8 between the first plate 1 and the third plate 3 and the second fluid channel 9 between the second plate 2 and the fluid plate 3 are alternately arranged along the width direction of the heat exchanger, the first fluid channel 8 with a lower temperature and the second fluid channel 9 with a relatively high temperature are alternately arranged along the width direction of the heat exchanger, thereby reducing the temperature difference between the surfaces of the first plate 1 and the second plate 2, so that the parts to have heat exchange on the side of the first plate 1 and the parts to have heat exchange on the side of the second plate 2 have the same heat exchange effect, and the temperature difference between the first plate 1 and the second plate 2 along the width direction of the heat exchanger is reduced, which makes the whole surfaces of the first plate 1 and the second plate 2 have excellent temperature uniformity.

It can be understood that the third plate 3 may be provided with more than three flat parts, for example, four flat parts, the first flat part and the third flat part abut against the first plate, the second flat part and the fourth flat part abutt against the second plate, thereby forming two first heat exchange channels and two second heat exchange channels which are alternately arranged.

The arrangement of the third fin 43 and the fourth fin 44 improves the heat exchange of the first fluid channel 8 and the second fluid channel 9, of course, the third fin 43 and the fourth fin 44 may not be provided, the first flat part 351, the second flat part 352, the third flat part 353 or the first plate 1 and the second plate 2 are provided with protrusions or grooves to improve the heat exchange of the first fluid channel 8 and the second fluid channel 9. It should be noted that the first flat part 351, the second flat part 352 and the third flat part 353 are not necessarily smooth planar structures, and other structures such as protrusions may be provided on them.

Figure 2:
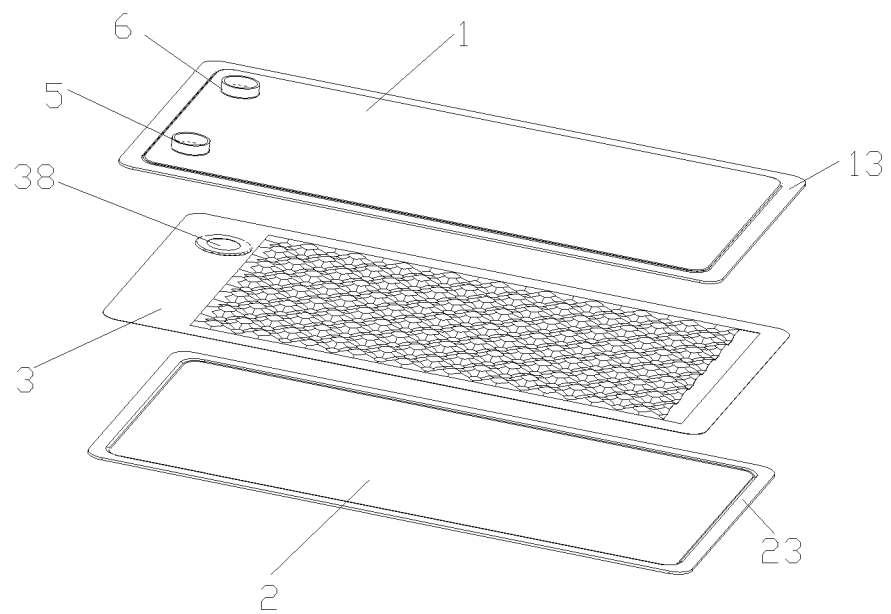
FIG. 2 is a schematic diagram of an explosion structure of the embodiment of the heat exchanger of the present application.

As shown in FIG. 2, a first fixing part 13 protruding towards the second plate 2 is arranged on the periphery of the first plate 1, a second fixing part 23 protruding toward the first plate 1 is arranged on the periphery of the second plate 2, the first fixing part 13 and the second fixing part 23 are fixed in a sealing way, so that a predetermined distance exists between the first plate 1 and the second plate 2, the outer periphery of the third plate 3 is sandwiched between the first fixing part 13 and the second fixing part 23, the first fixing part 13, the second fixing part 23 and the outer periphery of the third plate 3 can be fixed by welding or the like. Of course, the first plate 1 and the second plate 2 can also adopt other mounting structures, as shown in FIG. 3, the periphery of the first plate 1 is provided with a first flange 12 bent toward the second plate 2, the periphery of the second plate 2 is provided with a second flange 22 bent away from the first plate 1, the first flange 12 and the second flange 22 are fixed in a sealing way, the first flange 12 and the second flange 22 can be fixed by welding to ensure the sealing between the first plate 1 and the second plate 2. The first plate 1 and the second plate 2 adopt different mounting structures to adapt to different mounting environments and improve the mounting reliability of the heat exchanger.

The heat exchange provided by the present application is described in detail hereinbefore. The principle and the embodiments of the present application are illustrated herein by specific examples. The above description of examples is only intended to help the understanding of the idea of the present application. It should be noted that, for the person skilled in the art, many modifications and improvements may be made to the present application without departing from the principle of the present application, and these modifications and improvements are also deemed to fall into the protection scope of the present application defined by the claims.

What is claimed is:

1. A heat exchanger, at least comprising a fluid inlet, a fluid outlet, a first plate and a second plate, wherein a third plate is arranged between the first plate and the second plate, a first fluid channel is formed between the first plate and the third plate, a second fluid channel is formed between the second plate and the third plate, the heat exchanger has a first end and a second end, the fluid inlet is close to the first end of the heat exchanger and communicated with the first fluid channel, the fluid outlet is close to the first end of the heat exchanger and communicates with the second fluid channel, the first fluid channel is communicated with the second fluid channel at the second end close to the heat exchanger, wherein at least part of the first fluid channel and at least part of the second fluid channel are arranged adjacent to each other, wherein the third plate comprises a heat exchange part, along a vertical direction of an extension direction of the first fluid channel, a wall forming the first fluid channel and a wall with the second fluid channel are respectively located on both sides of the heat exchange part, wherein the third plate is provided with a plurality of first convex parts protruding toward the first plate and a plurality of second convex parts protruding toward the second plate, a plurality of second concave parts is formed on the side, facing the second plate, of the first convex parts, the plurality of first concave parts is formed on the side, facing the first plate, of the second convex parts, wherein the first fluid channel comprises a gap between the first plate and the first concave part, the second fluid channel comprises a gap between the second plate and the second concave part, wherein the plurality of first convex part and the plurality of first concave part are a plurality of first protrusions and a plurality of first pits alternately arranged along a length direction of the heat exchanger, and the plurality of first protrusions and the plurality of first pits are alternately arranged along a width direction of the heat exchanger, wherein the plurality of first protrusions are arranged in first rows, the plurality of first pits are arranged in second rows, and the first rows and the second rows intersect.

2. The heat exchanger according to claim 1, wherein along the width direction of the heat exchanger, a maximum width of at least part of the first concave part is smaller than a maximum width of at least part of the second concave part; or along a thickness direction of the heat exchanger, a maximum height of at least part of the first concave part is smaller than a maximum height of at least part of the second concave part.

3. The heat exchanger according to claim 1, wherein the first plate is provided with a plurality of third convex parts protruding toward the third plate; and/or, the second plate is provided with a plurality of fourth convex parts protruding toward the third plate; and/or a first fin is arranged between the first plate and the third plate to divide the first fluid channel into a plurality of first sub-channels, a second fin is arranged between the second plate and the third plate to divide the second fluid channel into a plurality of second sub-channels.

4. The heat exchanger according to claim 1, wherein the third plate is provided with at least a first flat part, a second flat part and a third flat part extending along the length direction of the heat exchanger, wherein the first flat part, the second flat part and the third flat part are arranged along the width direction of the heat exchanger, the first flat part and the third flat part abut against the first plate, the second flat part abuts against the second plate, wherein the first fluid channel comprises a gap between the second flat part and the first plate, wherein the second fluid channel comprises gaps formed between the first flat part and the second plate and between the third flat part and the second plate.

5. The heat exchanger according to claim 4, wherein a third fin is arranged between the second flat part and the first plate, a fourth fin is arranged between the first flat part and the second plate and between the third flat part and the second plate; and/or, the third plate is provided with a flow guiding part, and the flow guiding part is arranged close to the first end of the heat exchanger.

6. The heat exchanger according to claim 1, wherein the third plate is provided with a communication part penetrating through the third plate, the communication part is arranged close to the second end of the heat exchanger, the first fluid channel and the second fluid channel are communicated through the communication part.

7. The heat exchanger according to claim 1, wherein the fluid inlet and the fluid outlet are arranged on the first plate and are close to the first end of the heat exchanger, wherein the third plate is provided with a communication hole communicating with the fluid outlet, the fluid inlet is communicated with a first fluid channel between the first plate and the third plate, the fluid outlet is communicated with a second fluid channel between the second plate and the third plate through a communication hole.

8. The heat exchanger according to claim 1, wherein a first flange bent toward the second plate is arranged on the periphery of the first plate, a second flange bent away from the first plate is arranged on the periphery of the second plate, the first flange and the second flange are fixed in a sealing way; or, a first fixing part protruding toward the second plate is arranged on the periphery of the first plate, a second fixing part protruding toward the first plate is arranged on the periphery of the second plate, the first fixing part and the second fixing part are fixed in a sealing way.

9. The heat exchanger according to claim 2, wherein the third plate is provided with a communication part penetrating through the third plate, the communication part is arranged close to the second end of the heat exchanger, the first fluid channel and the second fluid channel are communicated through the communication part.

10. The heat exchanger according to claim 3, wherein the third plate is provided with a communication part penetrating through the third plate, the communication part is arranged close to the second end of the heat exchanger, the first fluid channel and the second fluid channel are communicated through the communication part.

11. The heat exchanger according to claim 2, wherein the fluid inlet and the fluid outlet are arranged on the first plate and are close to the first end of the heat exchanger, wherein the third plate is provided with a communication hole communicating with the fluid outlet, the fluid inlet is communicated with a first fluid channel between the first plate and the third plate, the fluid outlet is communicated with a second fluid channel between the second plate and the third plate through a communication hole.

12. The heat exchanger according to claim 2, wherein a first flange bent toward the second plate is arranged on the periphery of the first plate, a second flange bent away from the first plate is arranged on the periphery of the second plate, the first flange and the second flange are fixed in a sealing way; or, a first fixing part protruding toward the second plate is arranged on the periphery of the first plate, a second fixing part protruding toward the first plate is arranged on the periphery of the second plate, the first fixing part and the second fixing part are fixed in a sealing way.

* * * * *